United States Patent
Champion et al.

(10) Patent No.: US 6,734,919 B2
(45) Date of Patent: May 11, 2004

(54) SYSTEM AND METHOD FOR OVERLAY OF A MOTION VIDEO SIGNAL ON AN ANALOG VIDEO SIGNAL

(75) Inventors: Mark A. Champion, Seattle, WA (US); David H. Bessel, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 79 days.

(21) Appl. No.: 10/023,967

(22) Filed: Dec. 17, 2001

(65) Prior Publication Data

US 2002/0080280 A1 Jun. 27, 2002

Related U.S. Application Data

(62) Division of application No. 08/882,981, filed on Jun. 26, 1997.
(60) Provisional application No. 60/031,664, filed on Nov. 21, 1996, provisional application No. 60/031,663, filed on Nov. 21, 1996, and provisional application No. 60/020,555, filed on Jun. 26, 1996.

(51) Int. Cl.[7] .................................................. H04N 5/46
(52) U.S. Cl. ....................................... 348/558; 345/699
(58) Field of Search ................................. 348/554–558, 348/448, 449, 565, 542; 345/699, 698; H04N 5/46

(56) References Cited

U.S. PATENT DOCUMENTS

| | | | |
|---|---|---|---|
| 4,498,098 A | | 2/1985 | Stell |
| 4,509,079 A | * | 4/1985 | Harshbarger ................. 348/637 |
| 4,561,021 A | * | 12/1985 | Abe ............................ 348/558 |
| 4,580,165 A | | 4/1986 | Patton et al. |
| 4,611,228 A | | 9/1986 | Machida et al. |
| 4,837,621 A | * | 6/1989 | Yug ............................ 348/558 |
| 4,876,600 A | | 10/1989 | Pietzsch et al. |
| 4,962,429 A | | 10/1990 | Tong et al. |
| 5,134,481 A | | 7/1992 | Gornati et al. |
| 5,218,432 A | | 6/1993 | Wakeland |
| 5,506,954 A | | 4/1996 | Arshi et al. |
| 5,717,467 A | * | 2/1998 | Shiki .......................... 348/511 |

FOREIGN PATENT DOCUMENTS

| | | |
|---|---|---|
| DE | 36 19 799 A1 | 12/1987 |
| EP | 0 399 649 A3 | 11/1990 |
| EP | 0 399 649 A2 | 11/1990 |
| WO | WO93/15497 | 8/193 |

* cited by examiner

Primary Examiner—Michael H. Lee
(74) Attorney, Agent, or Firm—Blakely, Sokoloff, Taylor & Zafman LLP

(57) ABSTRACT

A system for overlaying a motion video signal onto an analog signal on a display. The system includes a motion video processing unit for receiving and processing the motion video signal into a signal having an analog video format, a video format analyzer and synchronizer device for receiving the analog signal and for determining video timing parameters and a corresponding original pixel clock of the analog signal and for controlling video timing parameters of the motion video signal to match the video timing parameters of the analog signal determined by the video format analyzer and synchronizer device so as to provide an output motion video signal which is synchronized with the analog signal and a display determining device for determining the display of the analog output signal or the synchronized output motion video signal on the display. The video format analyzer and synchronizer device includes a video format analyzer for determining horizontal and vertical video timing parameters of the analog signal, including vertical and horizontal sync times, active video time and vertical phase of the analog signal, a clock signal unit for receiving components of the analog signal and providing a synthesized clock signal to track the original pixel clock of the analog signal, and a frame controller for receiving a group clock signal, the group clock signal being a derivative of the synthesized clock signal, and for providing internal synchronization signals for synchronizing the video parameters of the motion video signal and the video parameters of the analog signal.

6 Claims, 10 Drawing Sheets

SYSTEM AND METHOD FOR OVERLAY OF A MOTION VIDEO SIGNAL ON AN ANALOG VIDEO SIGNAL

The present application is a divisional of the U.S. patent application Ser. No. 08/882,981, filed on Jun. 26, 1997, and entitled "System and Method for Overlay of a Motion Video Signal on an Analog Video Signal."

This application claims the benefit of Provisional Appl. 60/020,555 filed Jun. 26, 1996, Prov. Appl. 60/031,664 filed Nov. 21, 1996 and Prov. Appl. 60/031,663 filed Nov. 21, 1996.

BACKGROUND OF THE INVENTION

1. Field of the Invention

This invention relates to a method and apparatus for overlaying one video signal onto another video signal. More particularly, it relates to a system for combining a motion video signal from one source and an analog RGB signal from another source, such as a graphics signal generated from a computer as might be required in a personal computer-based video conferencing environment.

2. General Background

Recently, demand has increased for improved and convenient video conferencing systems. In response to such demand, personal computer-based video conferencing systems which offer real-time, point-to-point video conferencing, have recently been proposed, including such video conferencing systems which not only display the motion video images of the video conferencing participants, but which allow for the collaboration and sharing of data and computer programs between such participants. Such systems generally communicate via an integrated services digital network (ISDN), local area network, or even over the plain old telephone system (POTS).

Basically, in order to effect point-to-point video conferencing, an incoming motion video image from the non-local (far-side) party, must be decoded, converted to a video signal, and combined with a video signal from a local (near-side) camera. In addition, in the case of computer-based video conferencing, such video images must be further processed so that they may be combined with computer graphics, such as a user interface which controls the video conference session. Furthermore, in the computer-based video conferencing scenario, the computer is not only responsible for controlling the video conference session, but is also responsible for providing data, programs, and other material that is shared with the far-side party. Many of the aforementioned computer systems accomplish this result by the addition of internal circuitry or logic cards which accomplish the combination of the motion video and graphics directly.

FIGS. 1, 2 and 3 illustrate a display of the various types of images generated during a typical computer-based video conferencing session. More specifically, FIG. 1 illustrates a combined, or composite, image which might be displayed on the monitor of the person or person operating the video conferencing session on the local, or near-side, station who is communicating with another set of people who are located at a remote, or far-side, station. As seen in FIG. 1, preferably four windows are displayed, each containing different images which are either generated by the computer or by the various components of a video conferencing system. The window labeled 2 is the user's control center for initiating or terminating a video call or other functions as required for video conferencing, and is generated by a video conference control application or similar user interface program running on the computer on the near-side. As with other windows based applications, the video conference operator merely clicks on the desired task in order to effect that task. The window labeled 3 contains information generated by an application such as a spreadsheet, database or similar application, which is also running on the computer at the near-side. The data or other information contained therein may or may not be shared with the video conference participants on the far-side. Windows 4 and 5 are actually each composed of two components. More particularly, the window "frames" 6 are generated by the aforementioned video conference control application, while the content of these windows are created in the components of the video conferencing system. Near-side window 4 displays the image received at the local camera; e.g., the local video conference participant(s). The far-side window 5 displays the image received at the remote camera; e.g., the remote video conference participant(s).

FIG. 2 shows more clearly the image(s) created by the local computer. As seen therein, the contents of the near- and far-side windows are blank. (Although they are depicted in FIG. 2 as black, it will be appreciated that the contents may be arbitrary). On the other hand, FIG. 3 shows the image(s) created by the components of the video conferencing system; i.e., the images received by the near- and far-side cameras. When the above images are combined or "multiplexed", the resulting display is as shown in FIG. 3.

One computer-based video conferencing system is described in detail in U.S. Pat. No. 5,506,954, entitled "PC-Based Conferencing System" (Arshi et al). In the system shown in Arshi, real-time audio, video and data conferencing is effected in non-real-time "windows" environment. In order to accomplish such conferencing, analog video signals from a camera are first digitized by a video board, then decoded by a video capture module and compressed via video microcode running on a pixel processor. After storing the resulting compressed video in VRAM, the system's ISA bus interface transmits the compressed video to a host interface running on the host processor, which in turn, passes the compressed video on to a video manager. After time-stamping the compressed video for synchronization with the audio signals, the compressed video is transmitted to a communications manager, which in turn passes the compressed video through a digital signal processing (DSP) interface to an Industrial Standard Architecture (ISA) bus interface of an audio/communications board which stores the compressed video in a memory. Once the compressed video is thus stored, it is formatted for ISDN transmission to a remote site.

Prior art systems such as discussed above have several disadvantages. For example, in order to effect computer-based video conferencing, such systems generally require modification to and/or addition of existing computer hardware and/or software, which in turn requires that a user open and remove the computer case. This is inconvenient and costly to the user, and subjects the computer to a number of extraneous problems. Although an alternative to opening the computer case would be to use an "add in" product, such as a standard PCI bus plug-in card, most current "add in" products require the use of a significant portion of the computer's resources and computation capability. This can impair the ability of the computer to share applications with another party to the video conference session; i.e., collaborative data conferencing. Therefore "add in" products are not a viable alternative. Another problem which occurs with modification of existing computer hardware and/or software is that such modifications might negatively impact the possibility for future modifications and enhancements to the computer. For example, changes to the system's IRQ or I/O are often required when implementing a video conferencing system, and such changes may impede or even preclude future changes and/or upgrades to the system which may be necessary to keep the computer viable in a given technological environment. Finally, it is desirable to provide a video conferencing system which can be used almost universally with most computers. For example, laptops which require high quality conferencing, network computers (NC), older, less powerful computers, and computers and terminals which come in a closed (i.e., sealed) case, are precluded from being used for video conferencing purposes when the video conferencing must be added directly to the computer. Effecting the video conferencing process outside of the case of the computing device allows the range of computing devices to be considerably broadened so as to include these aforementioned devices among others.

It would be desirable therefore, to provide a system for overlaying motion video signals on computer graphics such as would be used in a real-time computer video conferencing system, wherein such system would be operable within most computers, including laptops, network computers, and sealed computers, but would not require modification of existing computer hardware and software, and thus would not necessitate increased cost and added inconvenience to the user.

SUMMARY OF THE INVENTION

Accordingly, it is one object of the present invention to provide a system and method for overlaying a motion video signal onto an analog signal.

It is another object of the present invention to provide a system and method for combining a video signal from a video source with an analog RGB signal, such as that generated by a computer.

It is yet another object of the present invention to provide a system and method for overlaying a motion video signal onto computer-generated graphics.

It is still another object of the invention to provide a computer-based video conferencing system which works universally with any computer, including laptops, is easy to install, and which does not require modification of the computer's preexisting computer hardware and/or software.

Another object of the invention is to provide a personal computer-based video conferencing system wherein the graphics generated from the computer are directly combined with motion video signals from the separate video conferencing apparatus.

Still another object of the invention is to provide a personal computer-based video conferencing system wherein the graphics generated from the computer are directly combined with motion video signals from the near-side and far-side cameras.

Therefore, in accordance with one aspect of the invention, a system for overlaying a motion video signal onto an analog video signal on a display is provided, wherein the system includes a motion video processing unit for receiving and processing the motion video signal from a motion video source into a signal having an analog format and a video format analyzer and synchronizer device for receiving the analog video signal and for determining video timing parameters of the analog signal and for controlling video timing parameters of the motion video signal to match the video timing parameters of the analog video signal determined by the video format analyzer and synchronizer device so as to provide an output motion video signal which is synchronized with the analog video signal. The system of the present invention further determines the display of the analog video output signal or the synchronized output motion video signal on the display.

According to another aspect of the present invention, the video format analyzer and synchronizer device of the present invention preferably includes a clock signal device, a programmable frame controller, and a video format analyzer. The clock signal device provides a synthesized pixel clock which is used to regenerate the original pixel clock of the analog video signal, and thus for synchronizing the motion video signal and the analog video signal. As the frequency of the synthesized pixel clock frequently exceeds the frequency capability of many common logic devices, the synthesized pixel clock is divided to a lower frequency signal, referred to as the "Group Clock" (GCLK) signal. This GCLK signal is used by the programmable frame controller as its clock signal, and it is the frame controller clock signal which is used for referencing all timing parameters (video envelope) of the resulting signal which is output to the display. Using programmable integers $H_{total}$ and $V_{total}$, the programmable frame controller creates "internal" $H_{sync}$ and $V_{sync}$ signals to be used in synchronization of the motion video signal with the "external" $H_{sync}$ and $V_{sync}$ components of the analog video signal.

According to yet another aspect of the invention, a primary purpose of the video format analyzer is to analyze the analog video signal, in order to determine the timing parameters (video envelope) of such signal. Preferably, the video format analyzer includes a counter, for measuring the various horizontal and vertical parameters of the analog video signal. The video format analyzer begins by measuring the various vertical timing parameters, including, the start and end of active video (vertical), and the interval between certain events to determine vertical front porch, vertical back porch, and vertical active video. All of these vertical measurements are made in units of horizontal sync pulses (or horizontal scan lines). In this way the vertical resolution of the source of the computer video signal 12 is accurately determined. Similarly, the video format analyzer then measures the various horizontal timing parameters of the analog video signal, including the start and end of active video (horizontal), and the interval between events to determine horizontal front porch, horizontal back porch, and horizontal active video, in order to determine horizontal resolution. Unlike the vertical timing parameters, all of the horizontal measurements are made using the GCLK signal as the unit of measurement. The GCLK signal is a function of both the $H_{sync}$ component of the analog video signal and the programmable integer $H_{total}$. While $H_{sync}$ is measured by the video format analyzer, accurate valuation of $H_{total}$ is desired and thus such value is determined by reference to a preselected horizontal resolution value preferably stored in a look-up table in memory and derived therefrom. If the derived value for $H_{total}$ is not consistent with the expected horizontal resolution, $H_{total}$ is adjusted (and thus the frequency of the synthesized pixel clock) until the measured horizontal resolution of the analog video signal is equal to its expected horizontal resolution. This ensures a correctly synthesized pixel clock.

According to still another aspect of a preferred embodiment of the present invention, in order for the video format analyzer to locate and measure the timing parameters of the analog video signal, the video format analyzer must be presented with video having known video content. The system of the present invention is preferably communicatively coupled to a computer which includes a mechanism for generating video having known video content. The known video generating mechanism preferably includes software in the computer for causing a video driver to generate a preselected number of preferably blue pixels (although red or green, or combination thereof, could be used), which are used by the system to detect the beginning and end of the active video time of the analog signal, and thus for determining the position and duration of the active video time of the analog signal so that this may be used to control the active video time of the motion video signal.

In another aspect of the present invention, the unit for determining the display of the i;o analog signal or the synchronized motion video signal on the display combines the signals and determines for a preselected number of pixels of each of the analog signal or the synchronized motion video signal, which of the two signals will be displayed. The display determining unit includes a video switch and a source controller. The video switch combines the signals and sources, or switches, the preselected number of pixels of the analog signal or the synchronized motion video signal to the display. This is effected under the control of the source controller, which is preferably a multiplexer control mask, having a memory for storing a plurality of values, wherein each value output from the memory of the multiplexer control mask controls the sourcing of the preselected number of pixels by the video multiplexer to the display. In a preferred embodiment, the system of the present invention is communicatively coupled to a computer having a user controllable video conference control application or other such user interface program, such application causing the display of "windows" in which the motion video signal will be displayed. The application would allow the user of the system to resize or move a window in a manner similar to the control of other "windows", and would send back to the multiplexer control mask for storing in its memory, information reflecting these changes.

In addition, according to another aspect of the present invention, the video format analyzer can be used to determine whether the video is interlaced or non-interlaced. In non-interlaced video, the time difference between the leading edge of $V_{sync}$ and the leading edge of $H_{sync}$ of the analog video signal will be constant for consecutive measurements of these events. If the video is interlaced, this difference varies by half a scan line with each $V_{sync}$. If interlaced video is detected, the condition is flagged and operation may be aborted, if desired.

In accordance with yet another aspect of the present invention, the system further includes logic for generating an interrupt if the vertical sync pulse of the motion video signal is not synchronized with the vertical sync pulse of the analog signal. The video format analyzer may be programmed to prevent the display determining unit from displaying the motion video signal on the display until the vertical sync pulse of the motion video signal becomes synchronized with the vertical sync pulse of the analog signal. Alternatively, the video format analyzer can be programmed to allow the display determining unit to continue to display the motion video signal on the display even if vertical synchronization between the motion video signal and analog signal is not maintained.

The features of the present invention believed to be novel are set forth with particularity in the appended claims. However, the invention itself may be best understood with reference to the following description in conjunction with the accompanying drawings.

DETAILED DESCRIPTION OF THE PREFERRED EMBODIMENT

Figure 1:
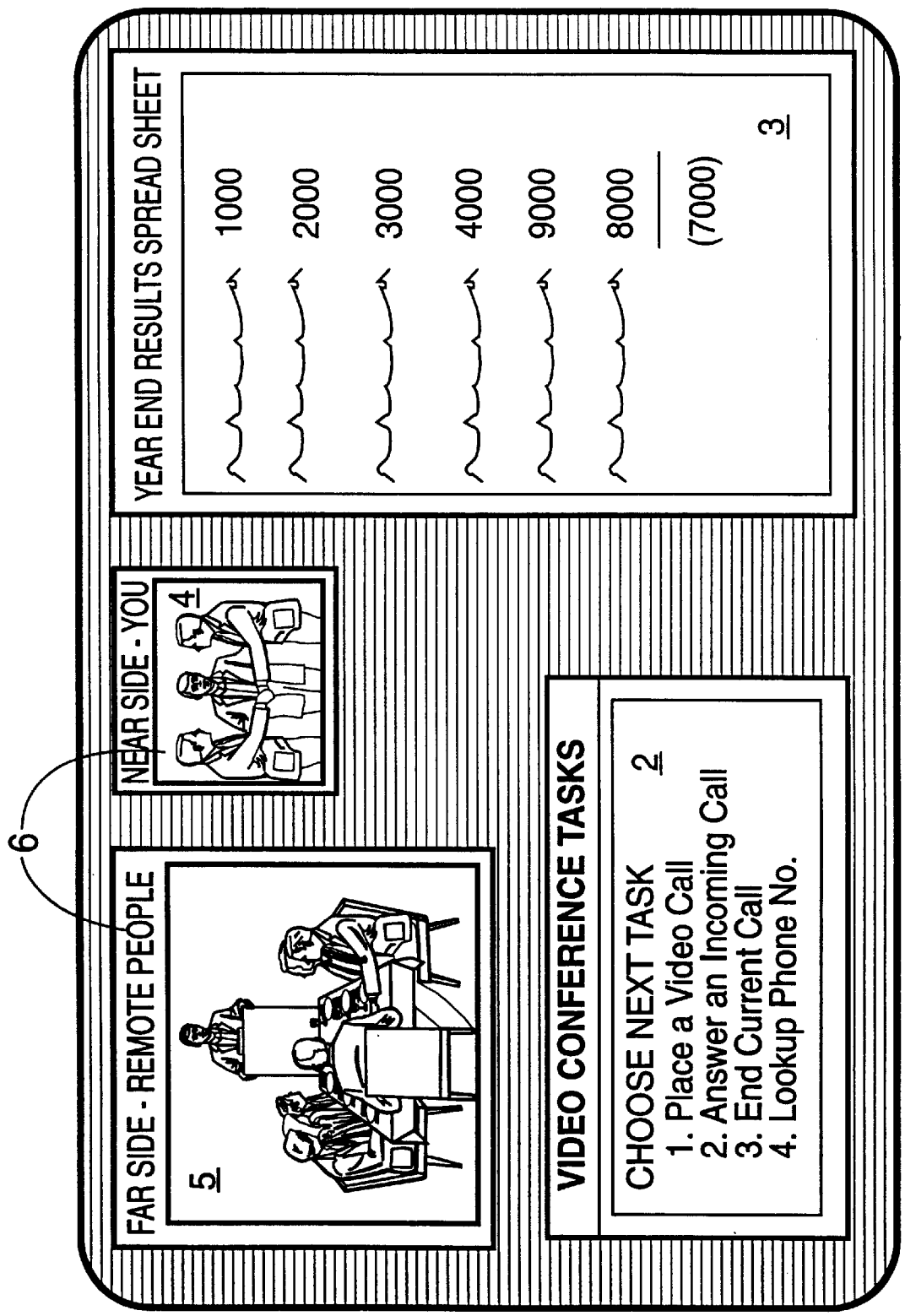
FIG. 1 is an example of a screen having multiple "windows" which might be displayed on the local, or near-side, monitor during a video conferencing session.

An embodiment of the system and method for overlaying or multiplexing a motion video signal and a RGB or similar analog signal will now be described in detail with reference to the accompanying drawings.

As set forth above, in order to effect video conferencing over a computer-based system, there is a need to combine the motion video signal containing the video conferencing images and other information with the video generated by the computer. It is desired to do this using the existing computer software and hardware; that is, without requiring the additional cost and inconvenience to the user of modification of the personal computer. Additionally, it is desired that such system be able to operate with any computer having graphics which meet or exceed VGA standards, including laptops and notebooks, thus eliminating the possibility of using a standard plug-in card solution.

In accordance with such objective, it was determined to combine the computer video and motion video signals by overlaying—or multiplexing (as used herein)—the motion video signals onto the computer-generated video. It will be understood to those skilled in the art, that although the present invention of overlaying a motion video signal onto an analog signal (e.g., an analog RGB or video signal generated by a computer) is preferably used in a computer-based video conferencing environment, it is not limited thereto, and may, in fact, be used in other environments and for a myriad of other applications; including, but not limited to, broadcast, multimedia and any other computer and video applications. Thus, while for the sake of simplicity, discussion of the present invention is generally limited herein to the video conferencing environment, the invention is in no way limited thereto.

Definitions

"Computer video and computer video signal" are used herein to mean an analog RGB video signal or signals generated by any computer. Further, such term as used herein, includes both video content or information as well as format and timing information that is necessary and separate from the video content.

"Far side image" is used herein to mean the motion video image sent from the remote site or sites participating in the video conferencing session.

"Group clock" or "GCLK" is used herein to mean a derivative of the "synthesized pixel clock". In the preferred embodiment, it is the "synthesized pixel clock" divided by four, and thus one GCLK period is required to shift out four pixels from the phase locked loop or similar device.

"Horizontal total" or "$H_{total}$" is used herein to mean the number of pixel groups contained in a single horizontal scan line. "$H_{total}$" is the sum of the horizontal pulse sync width, horizontal back porch ("$H_{back\ porch}$") horizontal active time, and horizontal front porch ("$H_{front\ porch}$") (as measured in pixel groups).

"Motion video signal" is used in the preferred embodiment to mean the "video signal" originating in the video conferencing system outside of the computer.

"Multiplexing" is used herein to mean the act of combining separate sub-images each of which may have differing "video envelopes".

"Near side image" or "vanity window" is used herein to mean the motion video image generated by a local camera in a video conferencing environment. It is optionally displayed on the local screen.

"Pixel clock" is used herein to mean the periodic digital clock associated with the computer video signal or other "video signal" from which all components of the "video signal" are referenced. It is preferably a high frequency signal, the rate of which defines when the pixels are updated. A derivative of the "pixel clock" or "group clock" (GCLK) is used to create the horizontal sync component of the "video envelope" of the computer video signal. "Original pixel clock" will be used to mean the pixel clock of the source of the "video signal", while "synthesized pixel clock" will be used herein to mean that pixel clock generated by a phase-locked loop which is iteratively adjusted so that it tracks the "original pixel clock".

"Pixel group" is used herein to mean four pixels, although it will be understood that in other embodiments, a different number may instead be used.

"Video content" or "Video information is used herein to mean a temporal and spatial dependent stream of data representing Red, Green and Blue components of an image, the latter of which may be either static or dynamic. "Video content" may be separated from the "video envelope" in the "video signal" for the purpose of compression, encoding, or other image processing purposes. For example, "video content" could be separated from its "video signal" and inserted into another "video signal" for a picture-in-picture (PIP) effect.

"Video envelope" is used herein to mean a composition of signal components with specific timing relationships used to convey a video image between two points. Signal components typically include Red, Green, Blue, horizontal sync, and vertical sync. "Video content" is inserted into the "video envelope" to result in a complete "video signal". If no "video content" is inserted into the "video envelope", the resulting "video signal" appears as a solid black image when viewed on a display device.

"Video signal" is used herein to mean a composite signal containing "video content" within a "video envelope".

Overview of the Operation of the Video Multiplexing System

Figure 4:
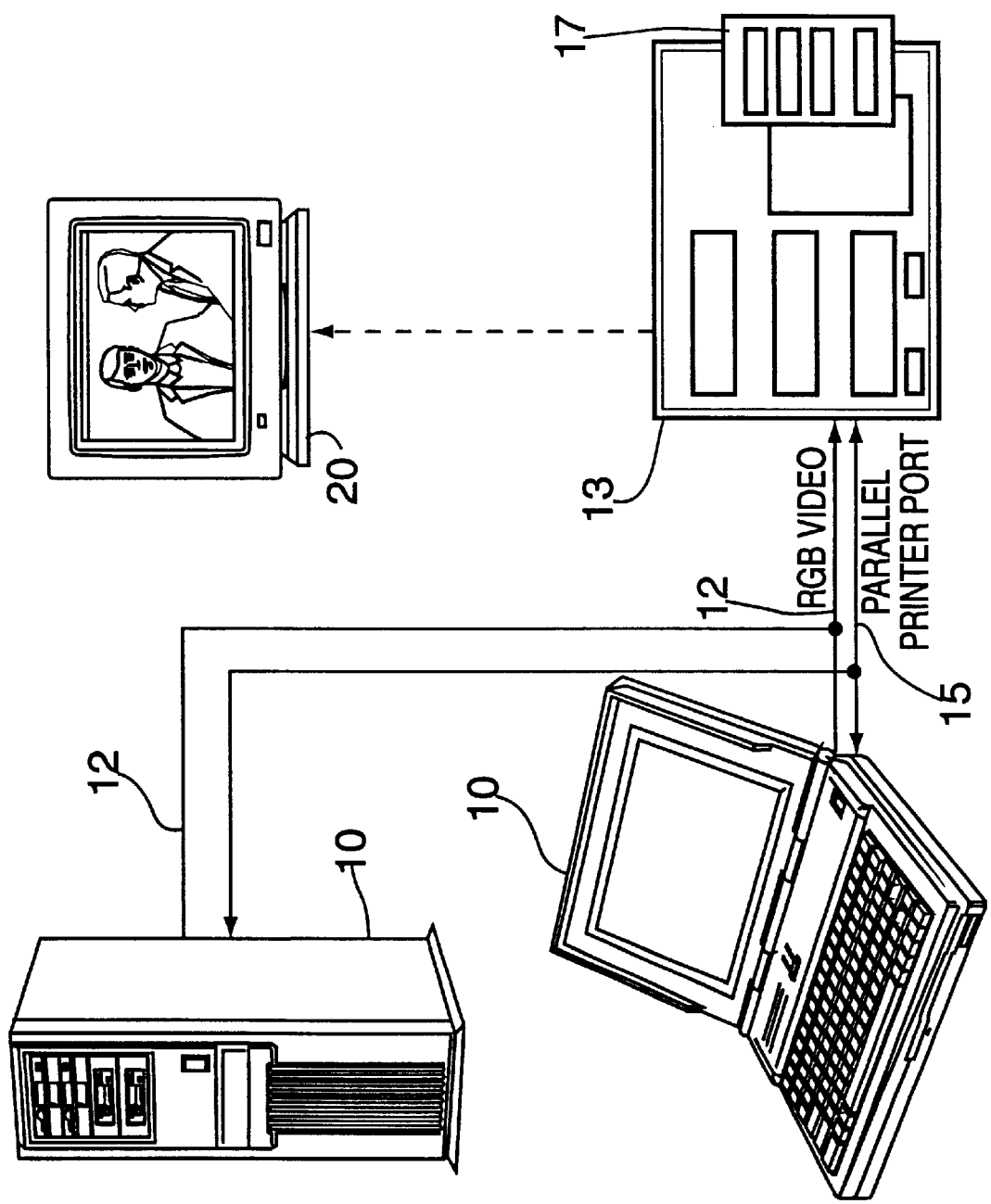
FIG. 4 is a diagram showing the preferred connection of the video multiplexing system of the present invention in a computer video conferencing environment.
Figure 5:
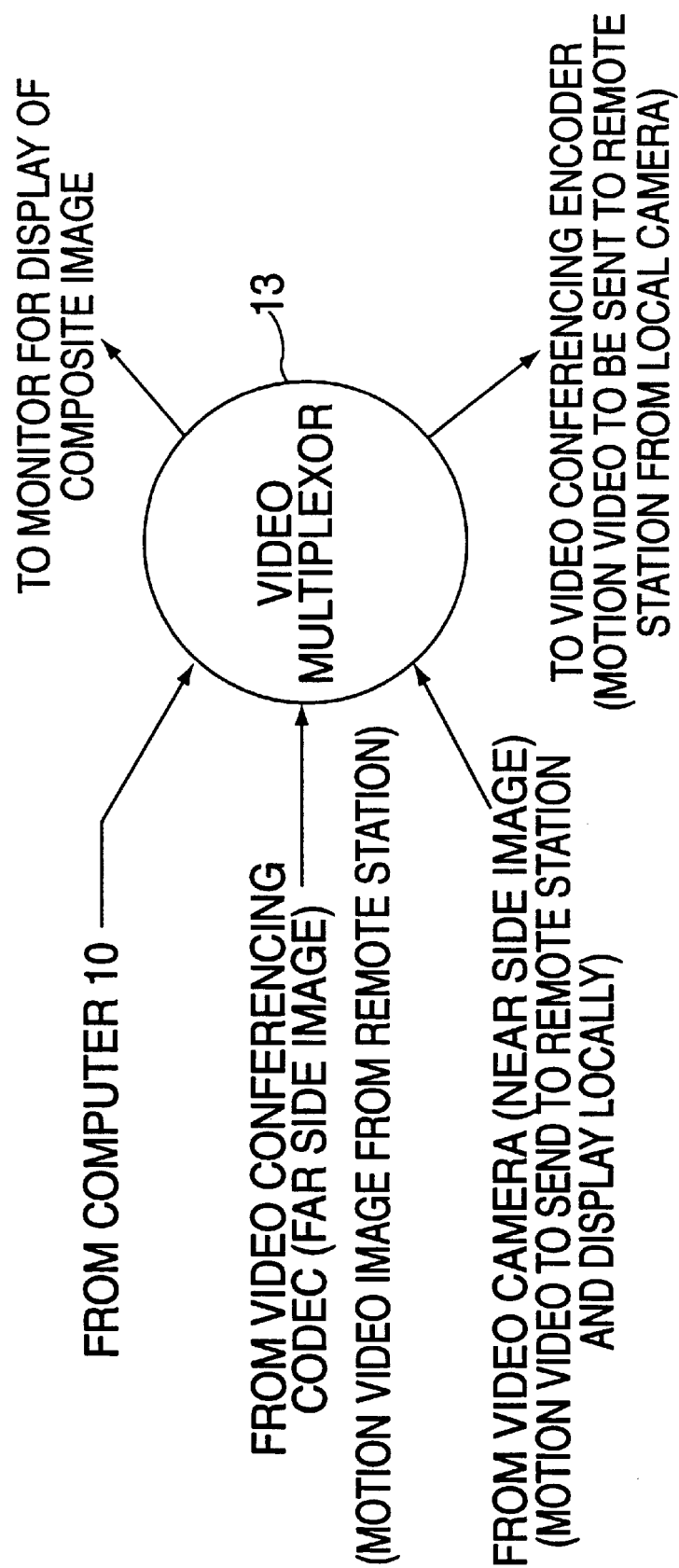
FIG. 5 is a diagram showing the major data flow into and out of the video multiplexing system of the present invention.

As seen in FIG. 4, a computer 10 (e.g., either a desktop, laptop PC, as seen in FIG. 1, or a NC-like device) provides an RGB analog computer video signal 12 (including image, timing and format information) to the multiplexing system 13 of the present invention. An additional data and control path 15 is established, preferably by connecting the computer's parallel port 21 to the video multiplexing system 13 of the present invention. This data and control path 15 is used to send messages to and from the computer and video multiplexing system 13 of the present invention. (While the data and control path 15 is preferably the computer's parallel port 21, it will be understood that any generally accessible, external, bi-directional port, such as a serial port or USB port may be used instead). The video multiplexing system 13 of the present invention combines the computer video signal 12 generated from the computer with incoming video signals from a local camera (near side) and from a distant camera (far side), and provides the resulting output on a monitor 20, as will be described in more detail in the following paragraphs. The general flow of data into and out of the video multiplexing system 13 may be understood with reference to FIG. 5.

As seen therein, images from the computer 10 are transmitted to the video multiplexing system 13 in the standard output format and over the standard path as would normally be sent directly to the monitor 20. Motion video from the remote (far-side) camera (not shown) is received in a video CODEC (not shown) in the video conferencing system and transferred to the video multiplexing system 13, while motion video from the local (near-side) camera is sent directly from the local camera to the video multiplexing system 13. A composite image (as discussed above) is then output from the video multiplexing system 13 for display on the monitor 20, and the image from the near-side camera is sent to a video conferencing encoder (not shown) where it is appropriately encoded before transmission to the far-side system.

Configuration and Operation of the Video Multiplexing System

Figure 6:
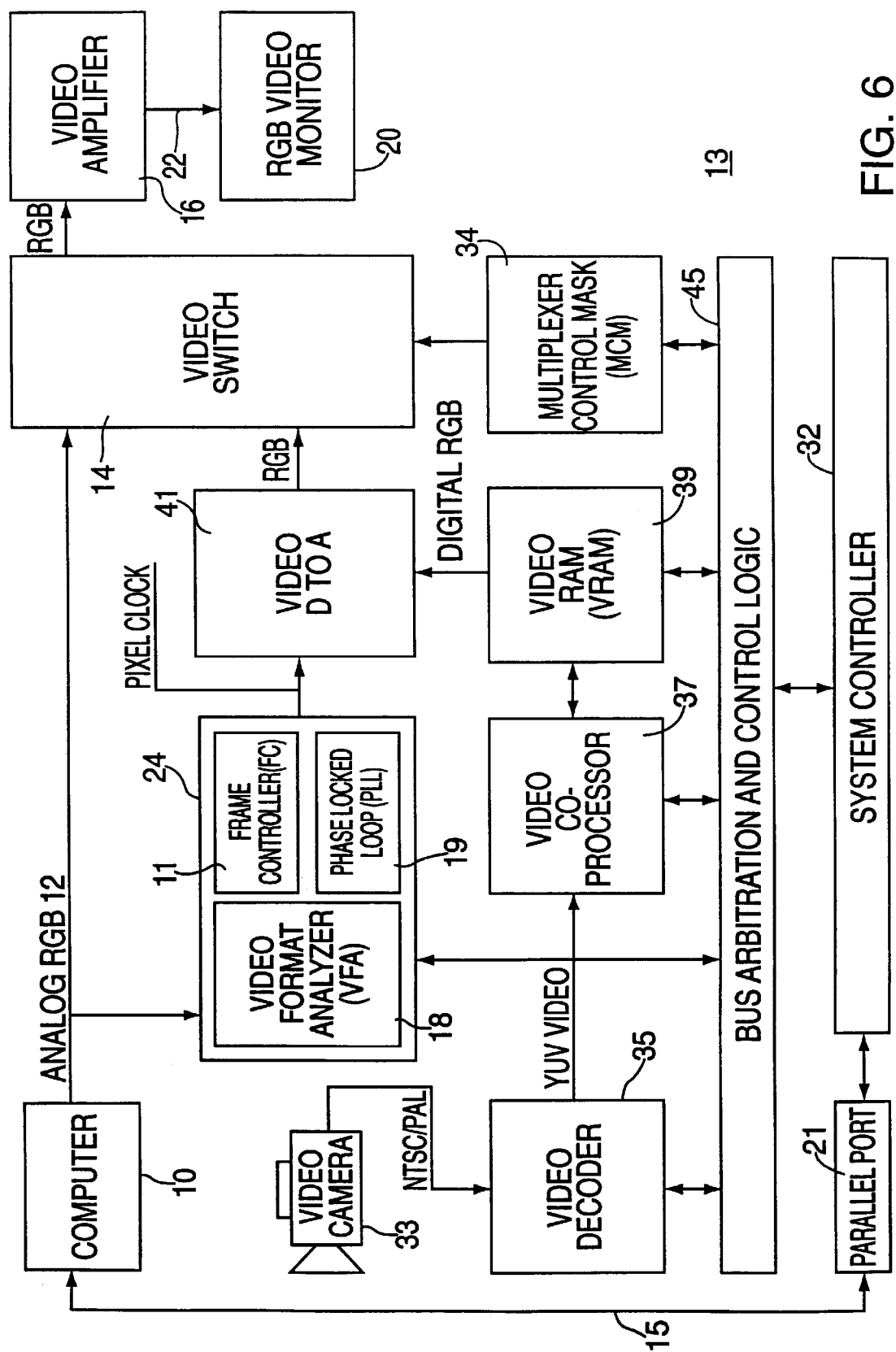
FIG. 6 is a block diagram of one embodiment of the system architecture of the video multiplexing system of the present invention.
Figure 7:
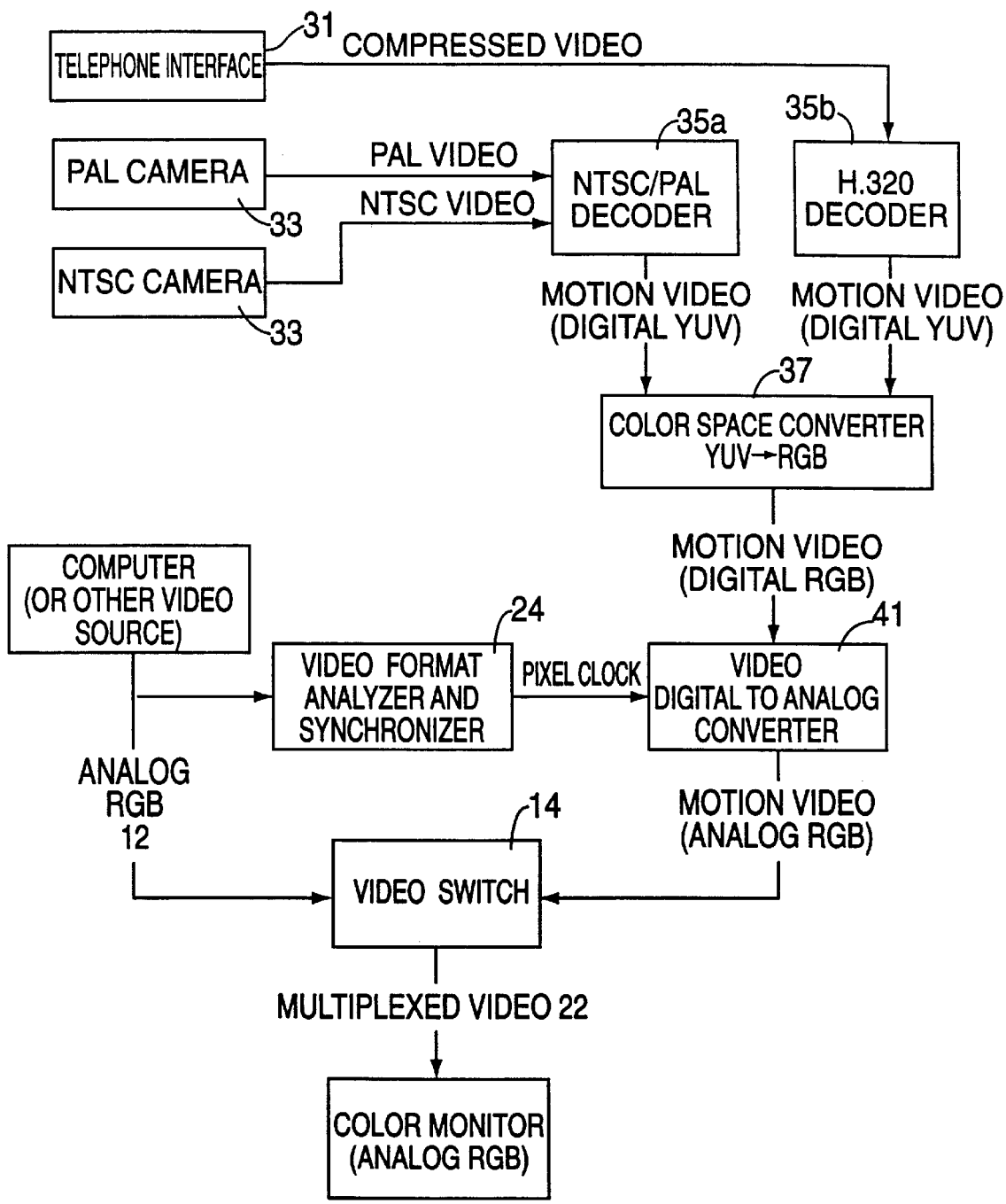
FIG. 7 is a diagram showing the processing of the motion video signals and the computer video signal in the video multiplexing system of the present invention.

A preferred embodiment of the video multiplexing system of the present invention as used in a videoconferencing environment will be described with reference to FIGS. 6, 7 and 8. In operation, it will appreciated that, initially, the computer video signal 12 which is output from the host computer 10 passes directly through the video switch 14 through video amplifier 16 to the monitor 20 unaffected (FIG. 6). Thus, the video multiplexing system passes the computer video signal 12 without modification. However according to the objects of the present invention, such computer video signal 12 from computer 10 (or graphics from some first video source) must be directly combined, in real-time, with motion video generated from a second video source or sources. In the preferred embodiment, wherein the multiplexing system of the present invention is used in a videoconferencing environment, the motion video is provided from a local video camera 33 (near-side video images) and a distant or remote video camera (far-side video images). Thus it is necessary for the motion video signals generated from the near- and far-side cameras (in the preferred embodiment) to operate within the same timing and format as the computer video graphics generated by the computer 10. Accordingly, in the preferred embodiment, the incoming motion video signals must be converted to analog RGB signals in order to match the color space of the computer video and the monitor 20, and the timing parameters of the computer video signal 12, including horizontal and vertical sync and active video time, must be analyzed in order to synchronize the motion video signals with the computer video signal 12. The multiplexing system 13 of the present system accomplishes this in a manner which will now be discussed.

I. Motion Video Processing

Again, according to the present invention, computer video graphics from the computer 10 must be combined, in real-time, with motion video generated from a second video source or sources. In the preferred embodiment, wherein the multiplexing system of the present invention is used in a video conferencing environment, the motion video is generally provided from a local video camera 33 (near-side video images) and a distant video camera (far-side video images) (FIG. 1) both of which preferably operate according to defined NTSC/PAL or other such standards such as compressed video received via a telephone interface 31. Again, as the motion video must be directly combined with the computer video signal from the computer 10, the video information contained in the NTSC/PAL-formatted or compressed motion video signal must be converted to an analog RGB format. Thus, the motion video, including video images and other information, generated by both the local video source 33 and the far-side video source (not shown), is captured and converted by video converter 35*a* or 35*b* to a 4:2:2 YUV formatted data stream, such process for conversion being known in the art (FIGS. 6 and 7) (If the motion video is either NTSC or PAL formatted, it is provided to an NTSC/PAL decoder 35*a*. If compressed video is received via a telephone interface 31 then it is instead decoded in an H.320 decoder, as known in the art (FIG. 7)). The thus formatted data is then placed into a video RAM (VRAM) 39 by the video co-processor 37. VRAM 39 is preferably a 2 MB VRAM. The video co-processor 37 converts and scales the YUV data to digital RGB by reading out the data from the VRAM 39, processing the data to convert same to digital RGB data through a process known in the art, and writing the thus digitized RGB data back into the VRAM 39. The digital information is then converted to an analog RGB signal by a video digital to analog (D/A) converter 41 before it is forwarded to the video switch 14. As seen in FIG. 6, the entire foregoing process is accomplished under the control of a controller 32, through bus arbitration and control logic 45. (In one embodiment the controller 32 is a digital signal processor (DSP) Model No. 320C80 commercially available from Texas Instruments, but any similar microprocessor or controller as known to those skilled in the art may be substituted. Similarly, the video D/A converter 41 is a D/A converter Model No. TVP3026, also commercially available from Texas Instruments).

Once the motion video signal is thus converted, it is now ready to be directly combined in the switch 14 with the computer video signal 12 from the computer 10. However, before the motion video signals (near- and far-side) and computer video signal 12 may combined, it must be ensured that they are first synchronized. Synchronization of these signals will now be discussed.

II. Synchronization of the Motion Video and Computer Video Signals

Again, it is desired that the present invention be adapted for use with almost any computer system, as long as the system graphics meet or exceed the VGA standard. Thus a variety of display types/formats (i.e., any of the standard VESA video formats) must be taken into consideration in the multiplexing system of the present invention. In view of such fact, it will be appreciated that in effecting synchronization (in format and timing) of the motion video signal and the computer video signal, the format of the incoming computer video signal is initially unknown, and thus that the vertical and horizontal parameters of such signal is unknown. As set forth above, such horizontal and vertical parameters must be determined in order to synchronize the motion video signal and the computer video signal.

In order to synchronize the motion video signal with a computer video signal of an unknown format, it is important that the signals' vertical sync ($V_{sync}$) and horizontal sync ($H_{sync}$) signals, as well as active video time, occur coincidentally. It is further desired to regenerate a pixel clock for the motion video signal which tracks the original pixel clock of the computer video signal 12, and to use this regenerated pixel clock as the basis to create synchronization. The video format analyzer and synchronizer (VFAS) 24 is used to effect these tasks.

A. Video Format Analyzer and Synchronizer

Figure 8:
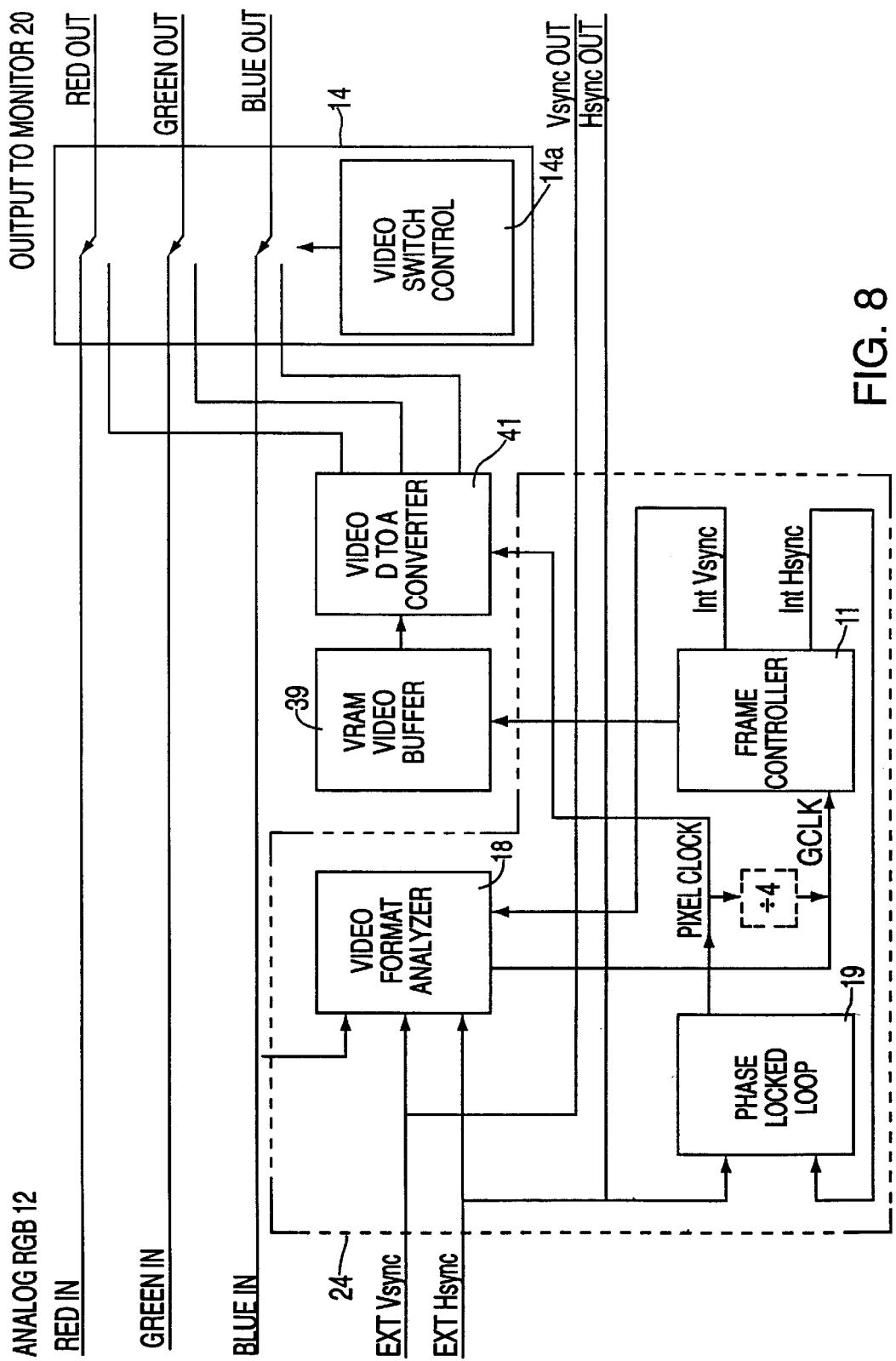
FIG. 8 shows a more detailed block diagram of the video format analyzer and synchronizer of the video multiplexing system of the present invention.

As seen with reference to FIGS. 6 and 8, portions of the computer video signal 12 (including vertical sync ($V_{sync}$), horizontal sync ($H_{sync}$), and the blue component of the computer video signal 12) are provided to the video format analyzer and synchronizer (VFAS) 24, which analyzes the computer video signal 12 to extract video timing information. Basically, the VFAS 24 duplicates the envelope of the computer video signal 12 from computer 10, so that the signals' envelopes are synchronized. As seen in FIG. 8, the VFAS 24 preferably includes a programmable frame controller (FC) 11, a video format analyzer (VFA) 18 and a wide-band phase locked loop (PLL) 19, although the frame controller 11, VFA 18 and wide-band PLL 19 may each constitute separate devices. A more detailed description of the operation of the VFAS 24 and its components is discussed below.

1. Programmable Frame Controller (FC) 11

Referring again to FIG. 8, VFAS 24 includes a programmable frame controller (FC) 11. The FC 11 includes a series of programmable counters (not shown) and performs typical video frame controller tasks as well known in the art, such as the generation of $H_{sync}$ and $V_{sync}$, and the generation of sequential frame buffer memory addresses for display purposes. Therefore detailed operation of FC 11 will not be discussed in further detail.

FC 11 is used in determining the timing parameters (i.e., the video envelope) of the output RGB analog video signal 22 which will be provided to the monitor 20. All timing parameters are thus referenced to the clock signal of the frame controller (FC) 11. As the frequency of the synthesized pixel clock frequently exceeds the frequency capability of many common logic devices, the synthesized pixel clock is divided to a lower frequency signal. This signal is then used as the frame controller's clock. In the preferred embodiment, the frame controller's clock is the synthesized pixel clock (generated by the PLL 19—discussed below) divided by four (FIG. 8), which will hereinafter be referred to as the Group Clock (GCLK). In a preferred embodiment of the present invention, divider logic available in the video D/A converter 41 was used to divide the synthesized pixel clock. However, it will be appreciated to those skilled in the art that any similar logic capable of scaling frequency may be used (Although division is shown in the embodiment FIG. 8 as occurring outside of the video D/A converter, it will be understood that it has been illustrated as such for simplicity and ease of understanding of the present invention, as not meant as a limitation).

FC 11 also generates "internal" $H_{sync}$ and $V_{sync}$ signals, which are used internally within the system. Specifically, the "internal" $V_{sync}$ signal is compared with the $V_{sync}$ of the computer video signal 12 to determine and maintain vertical phasing. The "internal" $V_{sync}$ signal is compared with the $V_{sync}$ of the computer video signal 12 by the VFA 18 to see if it is coincidental therewith. If it is, then it can be concluded that the "internal" $V_{sync}$ is synchronized with the $V_{sync}$ of the computer video signal 12 (except for possible vertical phasing adjustments, as discussed below). The "internal" $H_{sync}$ signal is used by the PLL 19 to synthesize or regenerate the original pixel clock from the $H_{sync}$ signal of the computer video signal 12 as described in the next section below.

In order to create the "internal" $H_{sync}$ signal, the FC 11 divides this GCLK by a programmable integer value called "$H_{total}$" to create an "internal" $H_{sync}$ signal, where $H_{total}$ is the number of group clock periods which occur in a horizontal scan line. This "internal" $H_{sync}$ signal is provided to the feedback input of the phase-locked loop 18 (FIG. 8). The FC 11 creates the "internal" $V_{sync}$ signal by dividing the "internal" $H_{sync}$ signal by $V_{total}$, the latter also being a programmable integer value equal to the total number of horizontal scan lines which occur in a single frame. (It is important to note that these "internal" $H_{sync}$ and $V_{sync}$ signals used for synchronization purposes, and are separate and distinct from the $H_{sync}$ and $V_{sync}$ components, respectively, of the computer video signal 12. For ease and clarity of understanding, therefore, the $H_{sync}$ and $V_{sync}$ components of the computer graphics 12, will hereinafter be referred to as "external $H_{sync}$" and "external $V_{sync}$", respectively). Accurate determination of $H_{total}$, and $V_{total}$ are thus important in the synchronization of the motion video and computer video signals and will be discussed in more detail in the forthcoming paragraphs. In addition to determining the above parameters, the FC 11 also determines other horizontal and vertical timing parameters including sync width, front porch and back porch through the use of other programmable integer values. As the relation of these parameters to the above-discussed parameters is known to those skilled in the art, they will not be discussed in detail.

2. Phase-Locked Loop (PLL) 19

In addition to the FC 11, the video format analyzer and synchronizer (VFAS) 24 also includes a phase-locked loop (PLL) 19. Again, it is desired to duplicate the video envelope of the computer video signal 12 and the corresponding original pixel clock. However, while some components of the video envelope of the computer video signal 12 may be simply extracted, such as $H_{sync}$ and $V_{sync}$, the original pixel clock (of the computer video signal 12) is not contained therein, and must be synthesized from the computer video signal 12. The purpose of the PLL 19 is to create (or regenerate) this pixel clock and to maintain synchronization of—or "lock"—the FC 11 with the computer video signal 12.

In the preferred embodiment, as seen in reference to FIG. 8, this is accomplished through the application of the "external" $H_{sync}$ (again, the $H_{sync}$ portion of the computer video signal 12) to the reference input of the PLL 19 and the "internal" $H_{sync}$ from the output of FC 11 to the feedback input of the PLL 19. It will thus be appreciated that PLL 19 attempts to maintain the feedback frequency (i.e., the frequency of "internal" $H_{sync}$) at the same frequency as the reference frequency (i.e., the frequency of "external" $H_{sync}$). In a preferred embodiment, the PLL 19 is preferably an ICS1522 chip commercially available from Integrated Circuit Systems, Inc., 2435 Boulevard of the Generals, Valley Forge, Pa. 19482.

Upon achieving a "locked" state, the PLL 19 output ("synthesized pixel clock" in FIG. 8) will operate at a frequency as determined according to the following equation:

$$f_{synthesized\ pixel\ clock} = 4 \times H_{total} \times f_{external\ Hsync}$$

Given that the GCLK signal is ¼ the frequency of that of the synthesized pixel clock, its frequency may thus be described as follows:

$$f_{GCLX} = f_{synthesized\ pixel\ clock}/4 = H_{total} \times f_{external\ Hsync}$$

Thus, it should be noted from the above equation that even though the "external" $H_{sync}$ frequency is unknown (and may indeed never be known), the PLL 19 can automatically recreate the original pixel clock of the computer video signal 12 once the correct $H_{total}$ value is selected. In other words, once the correct value for $H_{total}$ is determined, it will be possible to correctly synchronize the "external" $H_{sync}$ with the "internal" $H_{sync}$. As stated above, the determination of the correct $H_{total}$ value is described later in this document.

3. Video Format Analyzer (VFA)

Figure 9:
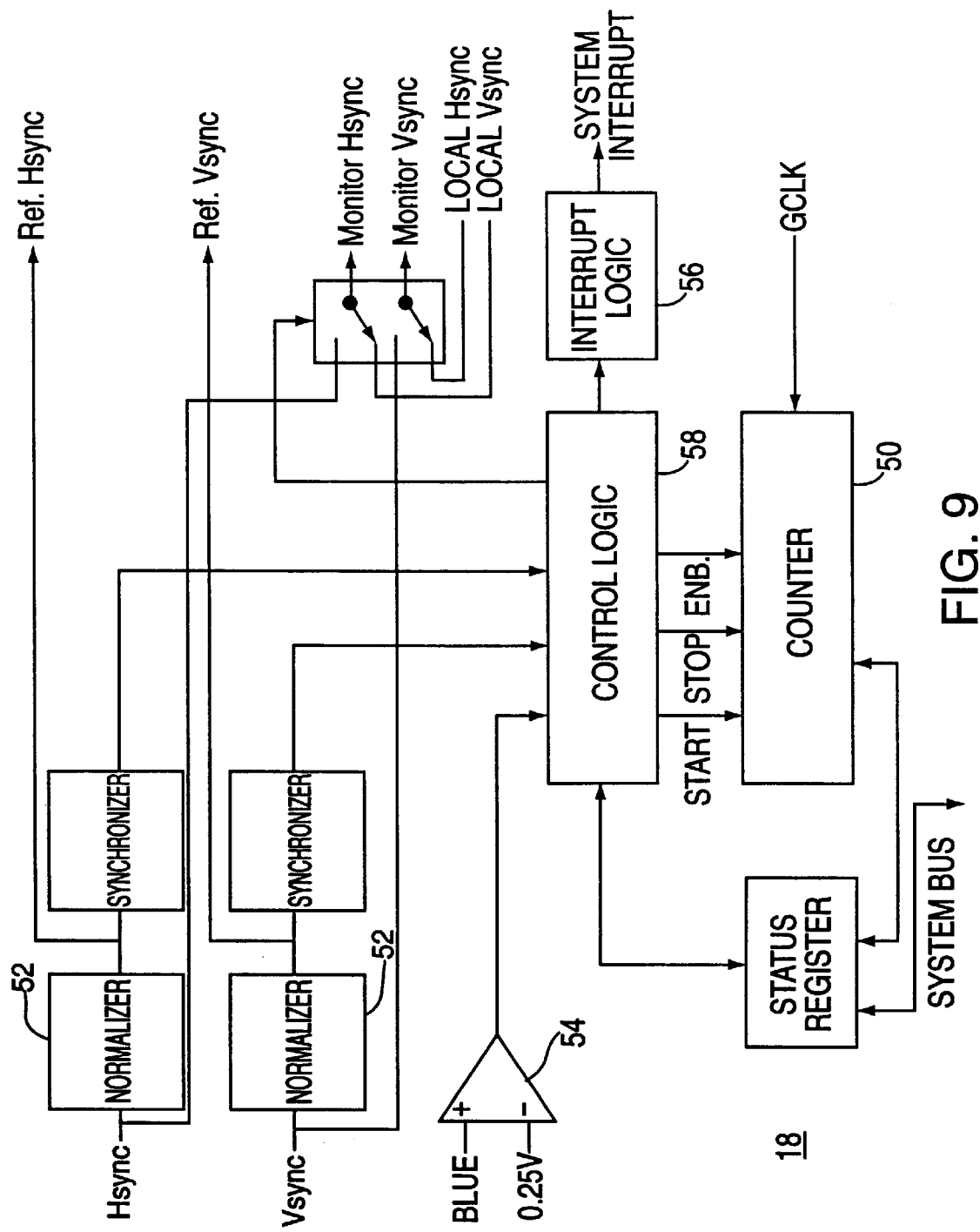
FIG. 9 is a block diagram of one embodiment of the video format analyzer of the present invention.

The VFAS 24 also includes a video format analyzer 18. The VFA 18 is preferably a medium-sized programmed array logic (PAL) containing a programmable counter, although it may constitute any similar logic device as known to those skilled in the art, such as an application-specific integrated circuit or a field programmable gate array. One embodiment of the VFA 18 is shown in FIG. 9.

A primary purpose of the video format analyzer's (VFA) 18 is that of analyzing the computer video signal 12 to determine its video envelope characteristics. In most cases, this analysis is performed by measuring the time between "events" of interest. "Events" of interest involve the video timing parameters of the computer video signal 12, and include: the leading edge of "external" $H_{sync}$ trailing edge of "external" $H_{sync}$ leading edge of "external" $V_{sync}$, trailing edge of "external" $V_{sync}$, leading edge of "internal" $_{sync}$, start of active video and end of active video (both horizontal and vertical). The reference time base for measurement of these parameters is GCLK (for measurement of events less than or equal to a single horizontal scan line) or "external" $H_{sync}$ (for measurement of events longer than a single scan line). For example, $V_{total}$—the number of horizontal scan lines in a frame—is determined by counting in counter 50, the number of "start of external $H_{sync}$" events that occur between two successive "start of external $V_{sync}$" events.

a. Sync Normalization by the VFA

In order for the VFA 18 to commence the various measurements of the "external" $H_{sync}$ pulse, it is necessary for it to "know" when such pulse is being asserted. The assertion of the external $H_{sync}$ pulse is determined by a "sync normalization" function in normalizer 52 which makes the determination based upon the duty cycle of the pulse. Sync normalization is necessary because the polarity of the $H_{sync}$ and $V_{sync}$ of incoming computer video signals may vary depending on the host computer 10. For example, as phase-locked loops such as PLL 19 operate on the edge of signals, it is required that PLL 19 be presented with an $H_{sync}$ pulse of positive polarity. As seen with reference to FIG. 9, the normalizer 52 will accept either polarity of $H_{sync}$ and $V_{sync}$ and respectively output a $H_{sync}$ and $V_{sync}$ pulse of positive polarity. The normalizer 52 may be implemented in a number of ways. One implementation includes a counter which counts up when a sync signal is positive and down when a sync signal is negative; therefore, at the end of the counting period, the sign bit of the counter will correspond to the sign of the sync pulse. This sign bit and the original sync pulse are then provided as inputs to an exclusive or (XOR) gate, so that the output is a positive polarity signal. Alternatively, the sync signal may be latched whenever active video is present, and as it known that since a sync pulse is not asserted during active video, the latched value will correspond to the sync polarity. It will be appreciated that the manner by which the sync pulse is normalized is not limited to these embodiments, and other methods of sync normalization may be used instead.

b. Active Video Measurements by the VFA

Again, one of the events of interest which the VFA 18 measures is the start and end of active video time. In order to measure the active video region of the computer video signal 12, the VFA 18 measures the vertical front and back porches (respectively, $V_{front\ porch}$ and $V_{back\ porch}$), as well as the horizontal front and back porches (respectively, $H_{front\ porch}$ and $H_{back\ porch}$) of such signal. The VFA 18 measures $V_{front\ porch}$ and $V_{back\ porch}$ indirectly, by measuring the time from the leading edge of "external" $V_{sync}$ to the start of video ($V_{start}$) and the time from the leading edge of "external" $V_{sync}$ to the end of video ($V_{end}$). However, to ensure that the VFA 18 accurately measures $V_{start}$ and $V_{end}$, it is required that the computer video signal contain known video on both the first and last scan line. This is accomplished by having a the above-discussed video conference control application or similar user interface program in the computer 10 cause the video driver (not shown) of monitor 20 to display a border 60 consisting of a number of pixels of a specified color at the boundary of the screen of monitor 20 for identifying the active video region of the computer video signal. (The requirement for the computer to generate known video content comes from the fact that the VFA 18 requires non-black video content at the borders to measure parameters such as front and back porch. However, in many situations sufficient video content will always exist—such as when running Windows® 95 with the default blue desktop. In other situations, a enhancement to VFA 18 could be created to accumulate video timing information over a period of time with the expectation that the computer would eventually display video information at the display borders.)

In the preferred embodiment, the video conference control application commands the video driver to place a blue border of eight (8) pixels around the screen of monitor 20, prior to the measurement of vertical resolution by VFA 18 (see above), although such border is not needed until the VFA 18 completes the measurement of the active video region discussed in this paragraph. The video conference control application then sends instructions to the VFA 18 to commence measurement of the active video time of the computer video signal 12 once the blue border is detected. In a preferred embodiment of the present invention, once measurement of the active video region has begun, the video conference control application sends a command over the bi-directional data and control path 15 to extinguish the blue border. In the above-discussed preferred embodiment, the video conference control application controls the commencement and substantially controls the termination of this operation (the multiplexing system may send interrupt commands to terminate the operation in certain circumstances, otherwise the blue border will be extinguished automatically after a set time period). However, it will be appreciated that, alternatively, the video multiplexing system 13 of the present invention may instead control the commencement and termination of this operation. (It will also be appreciated that the although the "depth" of the border is preferably eight pixels, such "depth" may instead constitute a different number of pixels and that another color, such as green or red pixels may be used instead of blue. Alternatively, a combination of such colors may be used, although it is simpler to use one of these primary colors. Additionally, it will be appreciated that instead of the automatic extinguishing of the blue border, if desired, the appearance of the blue border on the screen of monitor 20 may be eliminated through known video techniques such as chroma-keying.)

i. Vertical Measurement by the VFA

Once the blue border is established, the high speed comparator 54 signals when video is present (FIG. 9). In the embodiment of the VFA 18 shown in FIG. 9, the threshold for detection of video by the comparator 54 is 0.25 volts (which is appropriate for most video systems which output video ranging from 0.0 to 0.7 volts). The start of active video (vertical) measurement is performed by counting in counter 50 the number of horizontal sync pulses that occur between the leading edge of "external" $V_{sync}$ and the horizontal scan line during which video is first detected. The end of active video (vertical) measurement is performed by counting the number of horizontal sync pulses which occur between the leading edge of "external" $V_{sync}$ and the scan line during which active video is last detected. In a similar method, the VFA 18 can measure the interval between events to determine vertical front porch, vertical back porch, and vertical active video—all measured in units of horizontal sync pulses (or horizontal scan lines), as known to those skilled in the art. In this way the vertical resolution of the source of the computer video signal 12 is accurately determined.

ii. Horizontal Measurements by the VFA

Horizontal measurements are made in a similar manner by the VFA 18, the difference being that GCLK is used as the unit of measurement. The start of horizontal active video measurement is performed by counting in counter 50 the number of GCLK pulses which occur between the leading edge of the "external" $H_{sync}$ pulse and the point when active video is first detected (FIG. 9). The end of horizontal active video measurement is performed by counting the number of GCLK pulses which occur between the leading edge of the "external" $H_{sync}$ pulse and the point when active video is last detected. In addition to the above measurements, the VFA 18 can measure the interval between events to determine horizontal front porch, horizontal back porch, horizontal active video—again all measured in units of GCLK, as known to those skilled in the art. All of these parameters will be used to determine horizontal resolution.

However, as previously discussed, GCLK is a function of not only the "external" $H_{sync}$ frequency but of the integer parameter $H_{total}$ (in the FC 11), and therefore it is important that $H_{total}$ be accurately determined and specified to the FC 11 before any horizontal measurements are made. In order to ensure the accuracy of $H_{total}$, and thus determined horizontal resolution, this value is not directly determined by measurement, but instead, is determined by use of a lookup table in memory connected to controller 32. Determination of $H_{total}$ will now be discussed.

Measurement of $H_{total}$ and Video Synchronization by the Video Format Analyzer and Synchronizer (VFAS)

Figure 10:
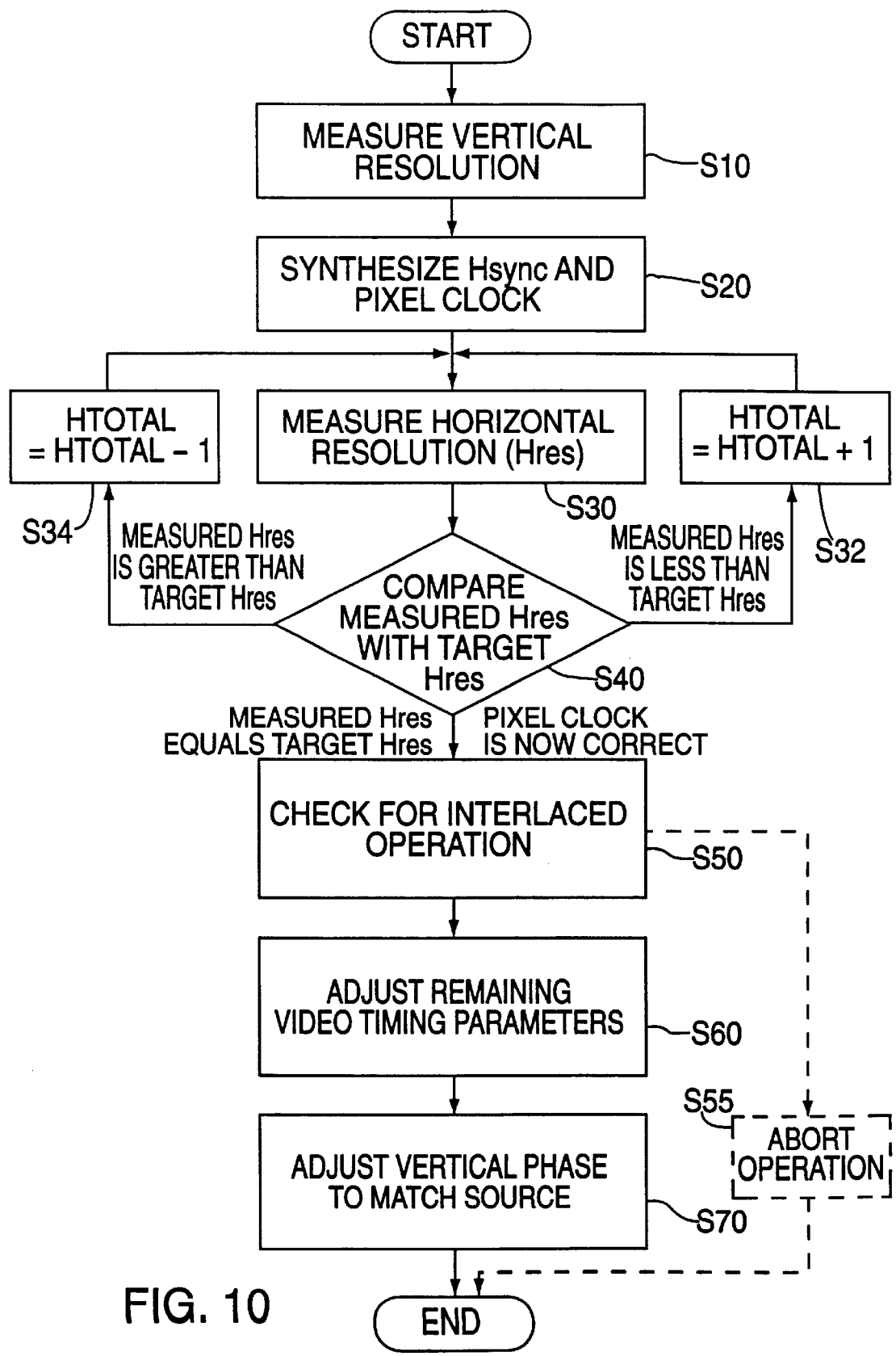
FIG. 10 is a flowchart showing the video synchronization process which occurs in the video multiplexing system of the present invention

FIG. 10 shows a flowchart of the basic steps associated with establishing a video locked state between the motion video signals and the computer video signal 12. (FIG. 10 shows a preferred embodiment of the steps in establishing a video locked state. Those skilled in the art will appreciate that the order of the steps may be altered, and or steps removed as desired). Description of this process will now be described.

First, as set forth above, vertical resolution of the computer is measured in step S10. Again, the video conference control application running in computer 10 causes the video driver in computer 10 to display a preferably blue border on the screen of monitor 20. Using this blue border, the VFA 18 measures the vertical active video which, in turn, directly determines the vertical resolution of the computer video signal 12.

After this measurement, the $H_{total}$ must be determined. Again, this value will be used to synthesize an "internal" $H_{sync}$ and the synthesized pixel clock. In step S20, the controller 32 uses the thus determined vertical resolution to look up the corresponding horizontal resolution in the following table (TABLE I) which is stored in memory as discussed above, in order to determine $H_{total}$. (Although in the embodiment discussed herein, horizontal resolution is determined via reference to a look-up table stored in memory, those skilled in the art will realize that other methods of determining horizontal resolution may be used instead; e.g., measurement of vertical resolution and calculation of horizontal resolution using equations well known in the art):

TABLE I

| Measured Vertical Resolution | Expected Horizontal Resolution |
|---|---|
| 480 to 599 | 640 |
| 600 to 767 | 800 |
| 768 to 863 | 1024 |
| 864 to 1023 | 1152 |
| 1024 to 1199 | 1280 |
| 1200 and above | 1600 |

A value for $H_{total}$ is then estimated (step S20) by the following formula:

$$H_{total} \text{ (est.)} = 1.2 \times (\text{Expected Horizontal Resolution}/4).$$

Once the estimated $H_{total}$ has been calculated, the VFA 18 measures the horizontal resolution of the computer video signal 12 by again measuring the interval between events of interest (as set forth in d, above) (step S30). Again, such measurement is made in GCLK units. If the measured resolution is less than the expected resolution, $H_{total}$ is incremented by one at step S32 and step S30 is repeated. This has the effect of increasing the frequency of the synthesized pixel clock. If the measured resolution is less that the expected resolution, $H_{total}$ is decremented by one at step S34 and step S30 is repeated. This has the effect of decreasing the frequency of the synthesized pixel clock. This process is repeated until the measured horizontal resolution is equal to the expected horizontal resolution. This ensures that the synthesized pixel clock has been correctly synthesized.

In the embodiment shown in FIG. 10, the computer video signal 12 is then further analyzed to determine if the display of monitor 20 is interlaced or non-interlaced (step S50). This is done in the VFA 18 by consecutive measurements of the time difference between the leading edge of $V_{sync}$ and the leading edge of $H_{sync}$. In non-interlaced video, this time difference will be constant. In interlaced video this difference varies by half a scan line for each successive $V_{sync}$. If interlaced video is detected, the condition is flagged and operation may be aborted (step S55), if desired, or the process may continue and the remaining video timing parameters may be next measured and adjusted (step S60).

Once determination is made as to whether the display is interlaced or not, the remaining video timing parameters are measured and adjusted accordingly in a manner similar to that discussed above (step S60). More specifically, the VFA 18 measures the remaining horizontal and vertical parameters and programs the FC 11 in accordance with these measurements. If desired, the video conference control application (FIG. 1) can be caused to extinguish the blue border, as is done in the preferred embodiment.

At this point, the motion video is now synchronized with the computer video signal 12 in all ways except for an expected phase shift in vertical sync. Thus, the next step (step S70) is to adjust the vertical phase of the motion video signal in order to match the vertical phase of the computer video signal 12. The VFA 18 accomplishes this by counting in counter 50 the $H_{sync}$ pulses between the leading edge of the internal $V_{sync}$ pulse and the leading edge of the $V_{sync}$ pulse of the computer video signal 12. This count represents the phase difference between the motion video signal and computer video signal 12 in units of horizontal scan lines. This phase difference is corrected by increasing $V_{total}$ by the phase difference for a single frame. $V_{total}$ is then immediately restored. The two video signals should now be completely synchronized.

Another important feature of the VFA is that if vertical lock between the motion video and computer video signal is lost (i.e., the "internal" $V_{sync}$ is not synchronized with the "external" $V_{sync}$), interrupt logic 56 under the control of control logic 58 will generate an interrupt. (FIG. 9) The VFA 18 can be programmed to prevent multiplexing of the motion video and computer video signals if synchronization is lost. In such a case, display of motion video on monitor 20 of computer 10 will be blanked until vertical lock is re-established. Likewise, multiplexing will occur only when vertical lock is re-established. Alternatively, if desired, VFA 18 can be programmed to multiplex the motion video and computer video signals irrespective of whether vertical lock is maintained. The latter is useful, for example, when trying to re-establish lock during video conferencing without losing the video conferencing channel altogether in the process, or if the display resolution is changed on the fly, such as during the display of a DOS screen.

Smart Video Switch and Multiplexer Control Mask

Once the motion video is processed appropriately, the aforementioned horizontal and vertical parameters of the display of the computer 10 determined, and the motion video and computer video signal 12 synchronized, the video multiplexing system 13 must determine whether the computer video signal 12 or the motion signal is to be displayed on the monitor 20.

Referring again to FIG. 6, the smart video switch 14 is an analog switch used to source either the computer video signal 12 or the motion video output from the video digital-to-analog (D/A) converter 41 to the screen of computer monitor 20 through video amplifier 43. In operation, the smart video switch 14 combines, or multiplexes, the computer video signal with the motion video output from the video digital-to-analog (D/A) converter 41, and then, upon information generated by a multiplexer control mask (MCM) 34 (discussed in the following paragraphs), selects the correct image source (computer 10 or motion video source), for display on the screen of monitor 20. Preferably the smart video switch 14 is a QS4A205 high speed analog multiplexer manufactured by and available from Quality Semiconductor, Inc., 851 Martin Avenue, Santa Clara, Calif., 95050. However, other similar commercially available multiplexers may be used instead. In the present invention, the smart video switch 14 is capable of switching between images on a boundary of at least every four (4) pixels, but may be made to switch for every one (1) pixel generated. While this would increase the resolution of the border between the computer video signal 12 from the host computer 10 and the video image to be displayed, it would also require more memory, and thus such increase in switch 14 switching speed depends on the amount of memory available to the multiplexer control mask (MCM) 34, operation of which will now be discussed.

As each raster line of the combined video is formed (motion video and computer video signal), the system of the present invention determines which image source is to be displayed—the computer video signal 12 or the motion video signal output from video D/A converter 41. This decision is controlled by memory in the multiplexer control mask (MCM) 34. Under the control of controller 32, the MCM 34 controls the sourcing to the smart video switch 14, of either the computer video signal 12 from the computer 10 or motion video signal output from the video D/A converter 41. Operation of the MCM 34 is similar in concept to alpha masks used in computer graphics and computer animation, and is commercially available (MARK: If we delete this sentence, we need to state that the MCM is to commercially available and give the product and manufactured name or otherwise give a fuller description). The "mask" serves as a template for drawing a background "window" 6 (FIG. 2) into which the motion video signal from the local video source 33 and far-side video source (not shown) will ultimately be displayed (FIG. 1). Thus, the MCM 34 is used to determine the display size and location of the window which will display the video signal received from the video signal source 30.

Figure 2:
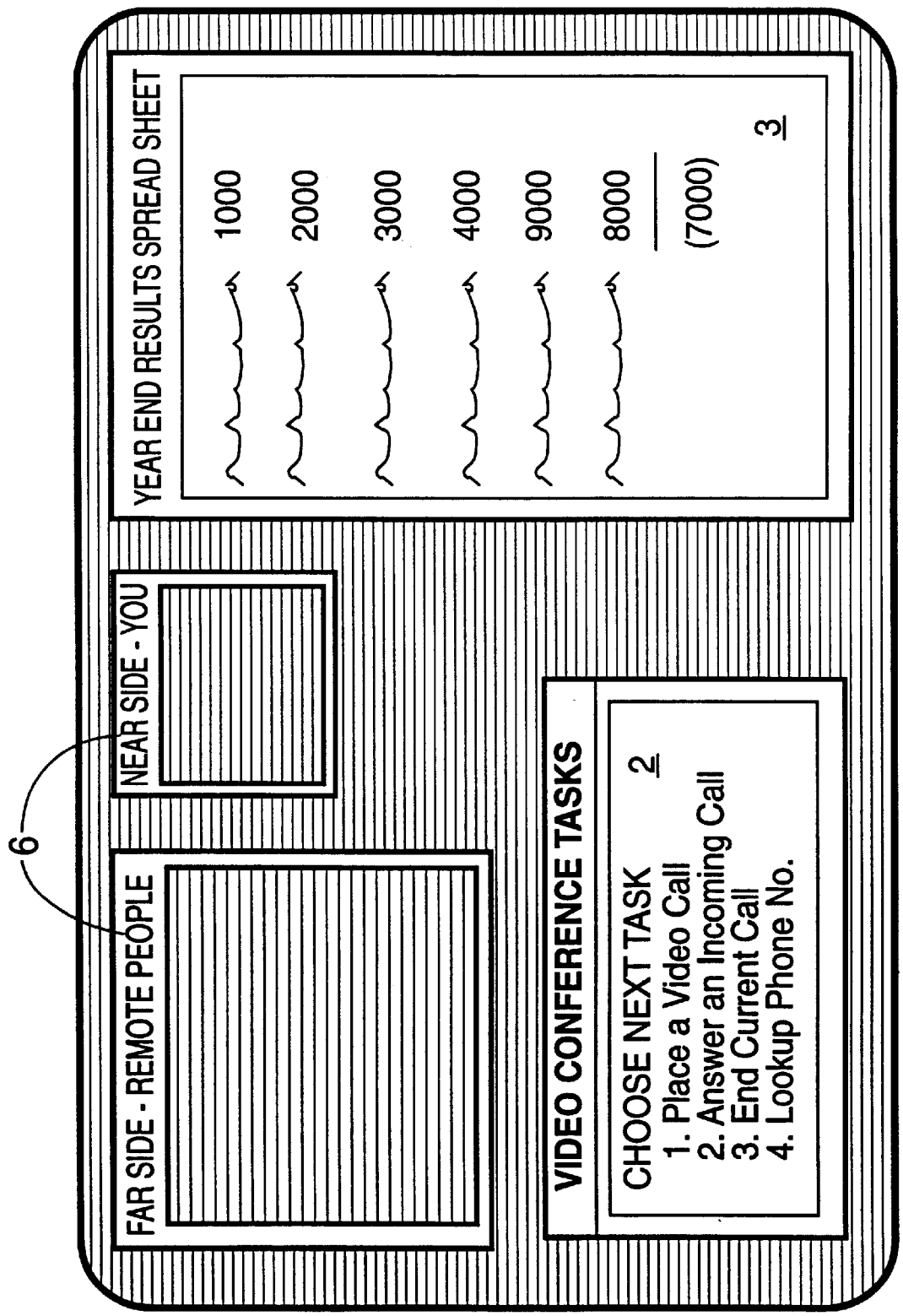
FIG. 2 is the portion of the screen of FIG. 1 which is generated by the local, or near-side, computer.
Figure 3:
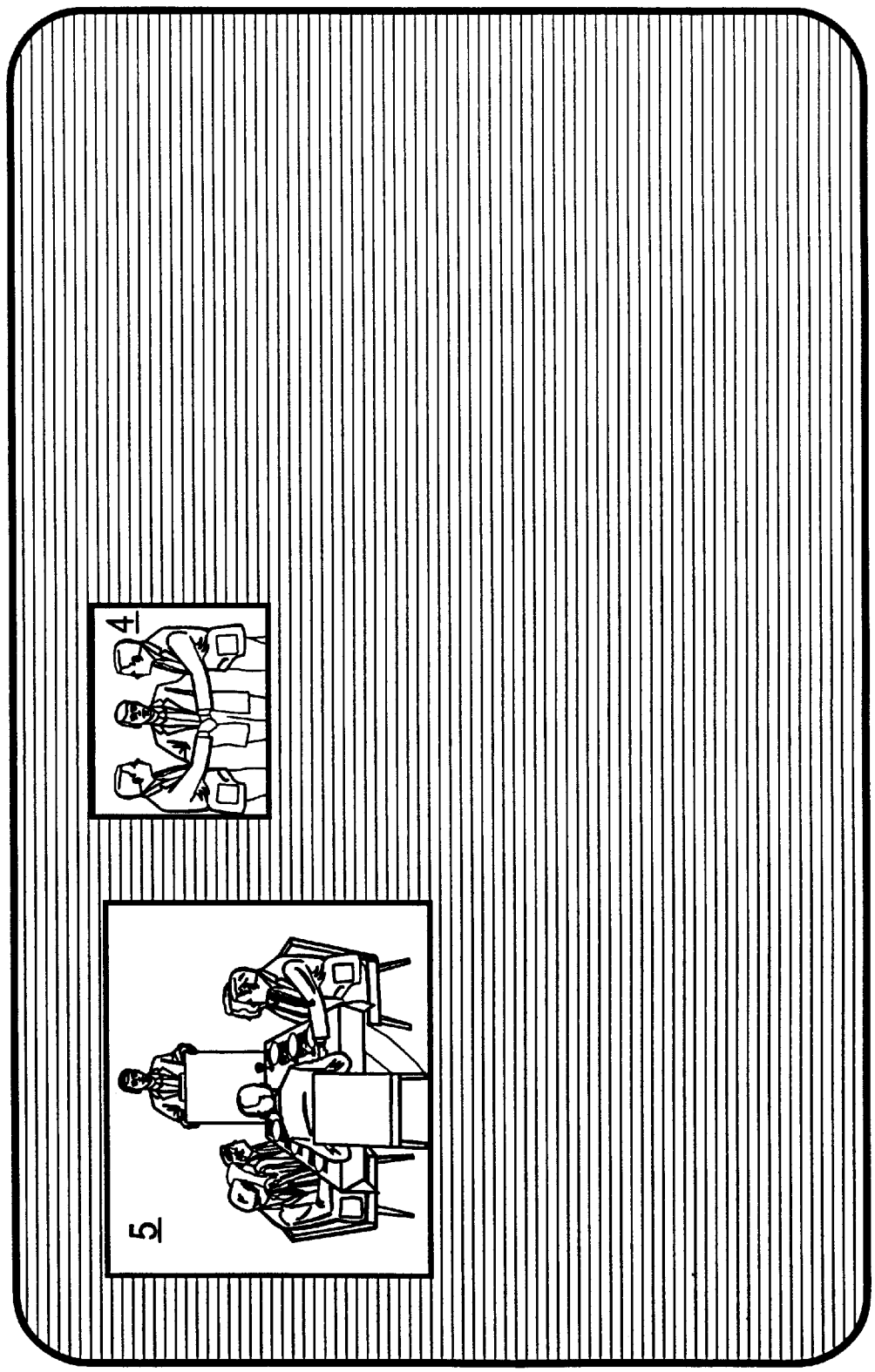
FIG. 3 is the portion of the screen of FIG. 1 which is created by a video conferencing system.

More particularly, each bit in the MCM 34 controls the source of video for a pixel or a multiple pixel block (e.g., a single bit in the MCM 34 controls a 4×4 pixel array in the preferred embodiment). The MCM 34 generates a continuous bitstream of pixel data having values of "0" or "1". Such values represent whether the switch 14 will source the computer video signal 12 from the computer 10, or whether it will source the motion video signal output from video D/A converter 41. In the preferred embodiment, a bit value of "0" will cause the smart video switch 14 to source the computer video signal 12 for four (4) horizontally adjacent pixels of the screen, for four consecutive horizontal scan lines, while a bit value of "1" will cause the smart video switch 14 to source the motion video signal output from the video D/A converter 41 for the four (4) pixels for four scan lines. (Again, resolution can be increased up to one (1) pixel, if desired, subject only to the amount of memory available to the multiplexer control mask MCM 34). As seen in FIGS. 1–3, the "windows" 6 created by the multiplexer control mask are much like other computer "windows" known in the art. Again, local video from the local video source 33 is ultimately displayed in one "window"; e.g, in the area 4, while video from the far-side video source is ultimately displayed in another window; e.g., in the area 5. Information generated by the computer video signal 12 is displayed in areas 2 and 3. Additional "windows" may be displayed by the MCM 34. Preferably, as discussed previously, these windows are used to display graphics information from an application such as a user interface program and which is used for controlling the system of the present invention. Although FIGS. 1–3 show these "windows" 6 to be rectangular, it will be appreciated that the MCM 34 may be programmed to display such "windows" in various other shapes. For example, if the granularity of the MCM 34 is made to be very fine—i.e., a resolution of one to two pixels, it is possible to create a window which has an arbitrary shape. Thus an outline view of the speaker could in fact be the "window".

The content of the memory of MCM 34 may be controlled by the video conference control application or similar user interface program running in the computer 10, via a remote control system (RCS). In the video conferencing embodiment, this application would control the size, position and stacking order of the near- and far-side windows. The user controls these factors in the same manner he would for any computer window. For example, if the user resizes or moves a window containing the near- or far-side motion video, this information is transmitted back to the RCS and then back to the multiplexer system of the present invention through controller 32 and bus arbitration and control logic 45, the system controller 32 adjusting the contents of the MCM 34 memory accordingly.

It is therefore apparent that in accordance with the present invention, an embodiment that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. For example, although the video multiplexing system of the present invention has been discussed in reference to a video conferencing environment, it will be appreciated that such multiplexing system has a broader range of uses, and may be used in several applications; e.g., a communications broadcast environment or a multimedia environment. Additionally, such multiplexing system may be used in a video test instrument or in a video format converter. Furthermore, although the source of the computer video signal 12 in the preferred embodiment is a computer outputting VGA-style RGB video with separate $H_{sync}$ and $V_{sync}$ pulses, the present invention is not so limited, and may be extended to all versions of RGB video, including video with composite $H_{sync}$ and $V_{sync}$, video with sync on green, as well as RS170 compliant video and its derivatives. In addition, the data and control path 15 which is established preferably by connecting the computer's parallel port to the video multiplexing system 13 may be that such as is consistent with the known IEEE 1394 standard. Additionally, although control of the motion video frame controller 11 is effected using software commands, it may alternatively be effected using a hardware implementation. Furthermore, although discussion of the present invention has been limited to the use of same in the video conferencing environment, it will be appreciated that the multiplexing system of the present invention is not so limited and may be used in other environments, including, but not limited to, broadcast, multimedia and any other computer and video applications. Other embodiments will occur to those skilled in the art. Accordingly, it is intended that the present invention embrace all such alternatives, modifications, and variations as fall within the scope of the appended claims.

What is claimed is:

1. A system for analyzing a plurality of video parameters of an analog signal received from an analog source, including horizontal and vertical sync times and active video time, said analog signal including horizontal and vertical sync pulses and an active video image portion, said system comprising:

pixel generating means for generating a first plurality of pixels at the beginning of said active video portion of said analog signal and a second plurality of pixels at the end of said active video portion of said analog signal; and a video format analyzer communicatively coupled to said pixel generating means, wherein said video format analyzer commences measurement of said active video image portion of said analog signal upon detection of said first plurality of pixels.

2. The system of claim 1, wherein said video format analyzer stops measurement of said active video image portion of said analog signal upon detection of said second plurality of pixels, the video format analyzer thereby determining the position and duration of said active video image portion within said analog signal.

3. The system of claim 2, where said pixels are blue.

4. A method for analyzing a plurality of video parameters of an analog signal received from an analog source, including horizontal and vertical sync times and active video time, said analog signal including horizontal and vertical sync pulses and an active video image portion, comprising:

generating a first plurality of pixels at a beginning of said active video portion of said analog signal and a second plurality of pixels at an end of said active video portion of said analog signal; and measuring said active video image portion of said analog signal upon detection of said first plurality of pixels.

5. The method of claim 4, further comprising stopping measurement of said active video image portion of said analog signal upon detection of said second plurality of pixels, thereby determining the position and duration of said active video image portion within said analog signal.

6. The method of claim 5, wherein at least one of said first plurality of pixels and said second plurality of pixels is blue.

* * * * *